Dec. 11, 1928.
F. W. CUTLER
SPRAY WASHER
Filed Jan. 25, 1927
1,694,734
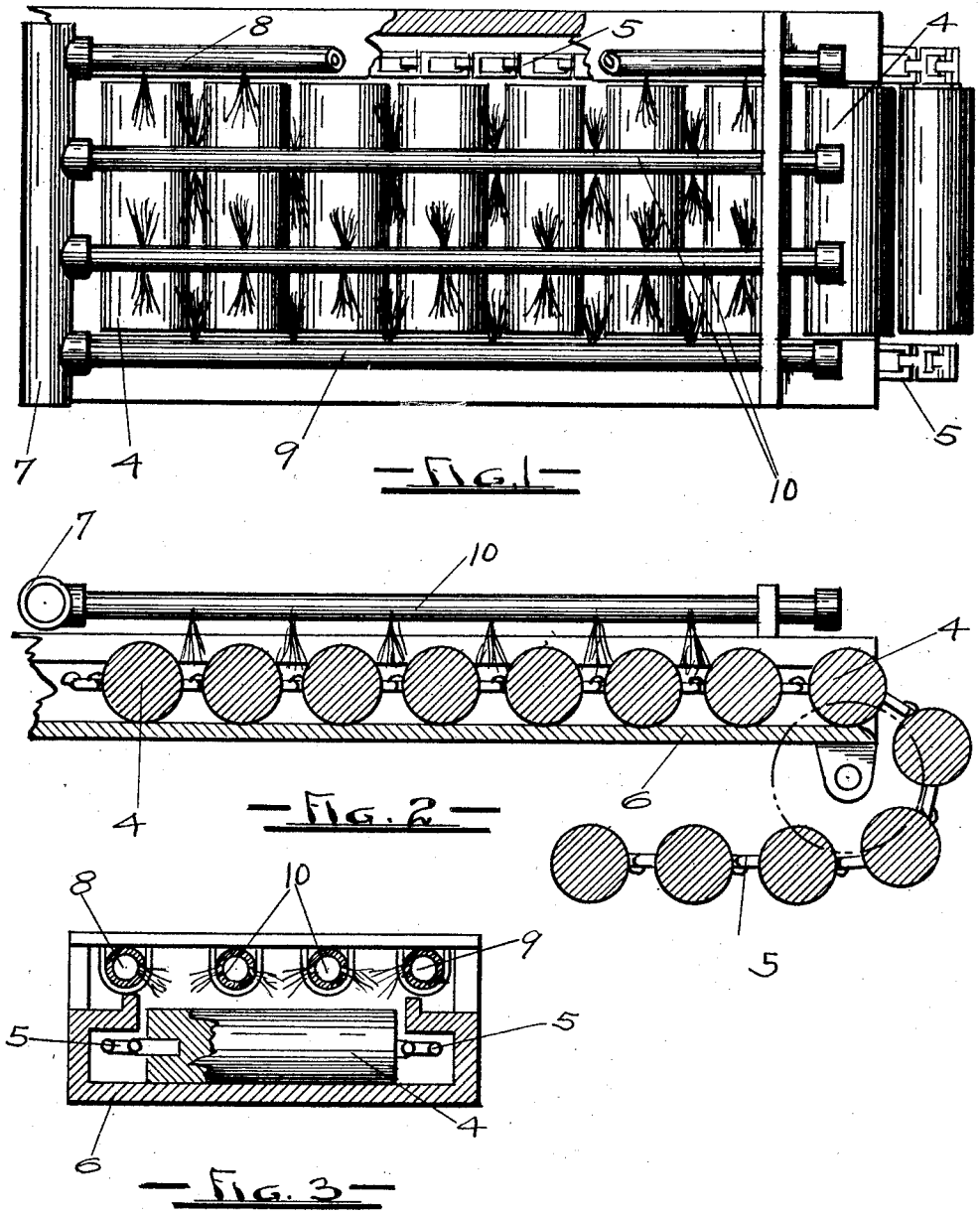
INVENTOR
FRANK W. CUTLER
BY C. F. Blake
ATTY.

Patented Dec. 11, 1928.

1,694,734

UNITED STATES PATENT OFFICE.

FRANK W. CUTLER, OF PORTLAND, OREGON.

SPRAY WASHER.

Application filed January 25, 1927. Serial No. 163,530.

My invention is in general related to spray washers, and particularly to such washers as are adapted to wash fruit upon a conveyor, the object being to provide an arrangement of parts that will deliver the spray into the stem and calyx ends of the fruit as it passes. I accomplish this object by means of the construction illustrated in the accompanying drawing, in which my device is shown in combination with a cross roll conveyor, to which it is particularly adapted. In the drawing, like parts are designated by like characters throughout the several views, in which:

Fig. 1 is a plan view of my invention.

Fig. 2 is a longitudinal sectional elevation of the same.

Fig. 3 is a transverse sectional elevation thereof.

The operating mechanism of the cross roll conveyor is omitted in the drawing for the reason that it is well known to the art and forms no part of this invention. The rolls 4, chains 5 and bed 6 upon which said rolls move are shown in the drawing so that the device which is the subject of this application may be understood. The fruit is deposited upon the cross roll conveyor and lies in the valleys between the rolls 4, traveling therewith, and being rotated as it travels. In the case of elongated fruit such as pears and some varieties of apples the fruit rotates upon its longer axis which is through the stem and calyx ends and therefore any spray directed downward upon the fruit will fail to remove deposits within the stem and calyx depressions. The present invention eliminates this difficulty.

Above the conveyor rolls 4 I mount a plurality of pipes connected to a header or manifold 7. These pipes are longitudinally positioned parallel with the direction of travel of the conveyor rolls and extend substantially the entire length of the conveyor, being capped or otherwise closed at their ends not connected with the manifold. Pipes 8 and 9 are positioned at the extreme ends of the rollers 4 and are orificed at intervals to allow liquid therein to issue in the form of spray jets. These spray jets are directed along the rollers in the direction of the length thereof and slightly downward thereupon, and therefore are adapted for impinging upon the stem and the calyx ends of the fruit as it passes.

A plurality of intermediate pipes 10 are disposed between the pipes 8 and 9, and are also orificed to allow liquid therein to issue therefrom in the form of spray jets spaced at intervals. These jets are directed similarly to the jets from the pipes 8 and 9.

The orifices in each of said pipes are alined along the pipes, but are staggered with the orifices in the adjacent pipes resulting in the jets being staggered relatively as shown in Fig. 1.

By this construction and arrangement of spray pipes the fruit is thoroughly washed, especially in its stem and calyx depressions.

My invention may be made of any size, and constructed of any materials deemed convenient and suitable for a device of this character, and while I have illustrated a form of construction and arrangement of parts found desirable in materializing my invention I wish to include in this application all mechanical equivalents and substitutes that may fairly be considered to come within the scope and perview of my invention as defined in the appended claims.

Having disclosed my invention so that others may be enabled to construct and to use the same, what I claim as new and desire to secure by Letters Patent is:

1. In a spray washer: a cross roll conveyor; a pair of spray pipes, one disposed at each end of said rolls and orificed to impinge jets of spray longitudinally along said rolls; spray pipes intermediate said former pipes and orificed to impinge jets of spray longitudinally along said rolls.

2. In a spray washer: a cross roll conveyor; a pair of spray pipes, one disposed at each end of said rolls and orificed to impinge jets of spray longitudinally along said rolls; spray pipes intermediate said former pipes and orificed to impinge jets of spray longitudinally along said rolls, the orifices in each of said pipes being staggered relatively to the orifices in an adjacent pipe.

3. In a spray washer: a cross roll conveyor and spray pipes thereabove orificed to impinge jets of spray relatively staggered and directed longitudinally along said rolls.

4. In a spray washer for fruit: a conveyor upon which the fruit is moved, and spray pipes adjacent thereto, said pipes being orificed to spray angularly directed jets transversely to the direction of travel of said conveyor.

In witness whereof I claim the foregoing as my own I hereunto affix my signature at Portland, county of Multnomah, State of Oregon.

FRANK W. CUTLER.